United States Patent
Powell, Sr.

(10) Patent No.: US 12,433,409 B2
(45) Date of Patent: Oct. 7, 2025

(54) TANDEM WHEELCHAIR ASSEMBLY

(71) Applicant: Joseph Powell, Sr., St. Louis, MO (US)

(72) Inventor: Joseph Powell, Sr., St. Louis, MO (US)

(*) Notice: Subject to any disclaimer, the term of this patent is extended or adjusted under 35 U.S.C. 154(b) by 760 days.

(21) Appl. No.: 17/744,149

(22) Filed: May 13, 2022

(65) Prior Publication Data

US 2023/0363541 A1  Nov. 16, 2023

(51) Int. Cl.
*A47C 7/02* (2006.01)
*A61G 5/02* (2006.01)
*A61G 5/08* (2006.01)
*A61G 5/12* (2006.01)

(52) U.S. Cl.
CPC .............. *A47C 7/024* (2013.01); *A61G 5/025* (2013.01); *A61G 5/08* (2013.01); *A61G 5/128* (2016.11)

(58) Field of Classification Search
CPC ........ A47C 7/024; A61G 5/128; A61G 5/025; A61G 5/08; A61G 5/0833
See application file for complete search history.

(56) References Cited

U.S. PATENT DOCUMENTS

| | | | |
|---|---|---|---|
| 4,484,755 A | | 11/1984 | Houston |
| 5,064,209 A | * | 11/1991 | Kurschat ............ A61G 5/1089 280/502 |
| 5,544,904 A | | 8/1996 | Maher |
| D431,212 S | * | 9/2000 | Haung ................ D12/129 |
| 6,443,252 B1 | | 9/2002 | Andes |
| 7,004,272 B1 | | 2/2006 | Brown |
| 7,481,439 B2 | * | 1/2009 | Thompson ............ B62B 9/14 280/47.38 |
| 7,597,332 B2 | * | 10/2009 | Thompson ............ B62B 7/00 280/47.38 |
| 8,006,786 B1 | | 8/2011 | Chapman |
| 8,157,273 B2 | * | 4/2012 | Bar-Lev ................ B62B 9/26 280/47.38 |
| 8,186,705 B2 | * | 5/2012 | Greger .................. B62B 7/08 280/643 |
| 8,757,646 B2 | * | 6/2014 | Coleraine ............ B62B 7/008 280/47.4 |
| 8,857,829 B2 | * | 10/2014 | Cheng .................. B62B 9/26 280/47.38 |
| 9,511,789 B2 | * | 12/2016 | Cheng .................. B62B 9/28 |

(Continued)

FOREIGN PATENT DOCUMENTS

WO  WO03034968  1/2003

*Primary Examiner* — Valentin Neacsu
*Assistant Examiner* — Michael R Stabley

(57) ABSTRACT

A tandem wheelchair assembly for wheeling two people simultaneously includes a front wheelchair and a rear wheelchair, which can seat a first person and a second person, respectively, and which comprise a first frame and a second frame, respectively. A plate is fixedly attached, by its first end, proximate to a rear end of the first frame so that the plate extends from the rear end. A forward end of the second frame is attached to a second end of the plate. The plate extends between the front wheelchair and the rear wheelchair and is substantially parallel to a surface upon which the front wheelchair and the rear wheelchair are positioned. Feet of the second person can be rested upon the plate. An attendant is positioned to wheel the first person and the second person simultaneously across the surface.

4 Claims, 6 Drawing Sheets

(56) References Cited

U.S. PATENT DOCUMENTS

| | | | |
|---|---|---|---|
| 11,214,329 B2 * | 1/2022 | Lu | B62K 5/06 |
| 11,220,282 B2 * | 1/2022 | Chaudeurge | B62B 9/082 |
| 11,414,119 B1 * | 8/2022 | Morgan | B62B 5/0016 |
| 11,648,972 B2 * | 5/2023 | Mallette | B62K 11/10 |
| | | | 180/14.1 |

* cited by examiner

TANDEM WHEELCHAIR ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to wheelchair assemblies and more particularly pertains to a new wheelchair assembly for wheeling two people simultaneously. The present invention discloses a wheelchair assembly comprising a front wheelchair and a rear wheelchair that carries two people and pushed by a single attendant.

(2) Description of Related Art Including Information Disclosed Under 37 CFR 1.97 and 1.98

The prior art relates to wheelchair assemblies, which may comprise wheelchairs and motorized chairs having riding platforms. The prior art does not teach two wheelchairs attached in tandem for transported two people. What is lacking is a wheelchair assembly comprising a front wheelchair and a rear wheelchair that carries two people and pushed by a single attendant.

BRIEF SUMMARY OF THE INVENTION

An embodiment of the disclosure meets the needs presented above by generally comprising a front wheelchair and a rear wheelchair, which are configured to seat a first person and a second person, respectively, and which comprise a first frame and a second frame, respectively. A plate is fixedly attached, by its first end, proximate to a rear end of the first frame so that the plate extends from the rear end. A forward end of the second frame is attached to a second end of the plate. The plate extends between the front wheelchair and the rear wheelchair and is substantially parallel to a surface upon which the front wheelchair and the rear wheelchair are positioned. The plate is configured so that feet of the second person can be rested upon it. An attendant is positioned to wheel the first person and the second person simultaneously across the surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
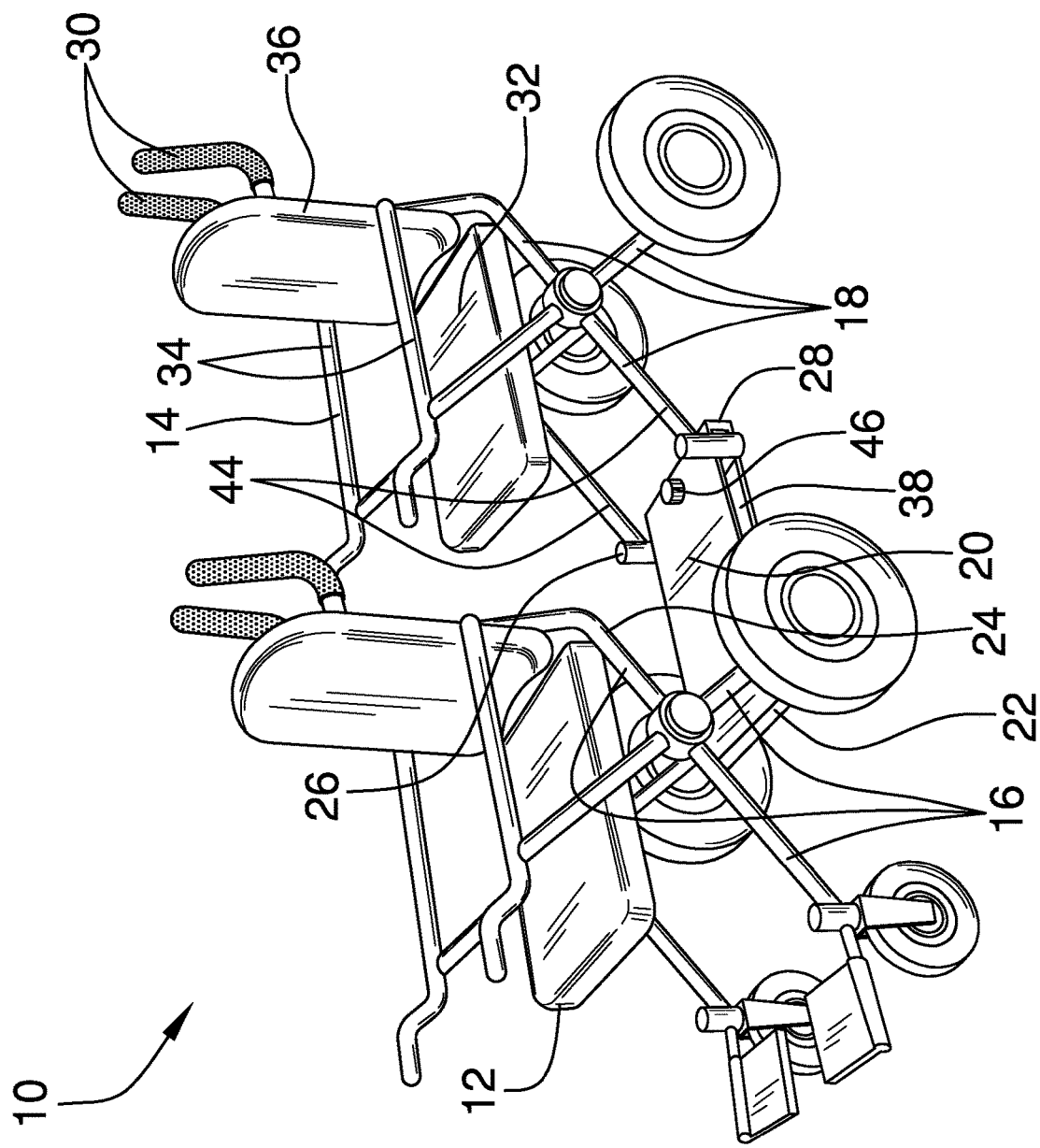
FIG. 1 is an isometric perspective view of a tandem wheelchair assembly according to an embodiment of the disclosure.

With reference now to the drawings, and in particular to FIGS. 1 through 7 thereof, a new wheelchair assembly embodying the principles and concepts of an embodiment of the disclosure and generally designated by the reference numeral 10 will be described.

As best illustrated in FIGS. 1 through 7, the tandem wheelchair assembly 10 generally comprises a front wheelchair 12 and a rear wheelchair 14, which are configured to seat a first person and a second person, respectively, and which comprise a first frame 16 and a second frame 18, respectively. A plate 20 is fixedly attached, by its first end 22, proximate to a rear end 24 of the first frame 16 so that the plate 20 extends from the rear end 24. A forward end 26 of the second frame 18 is attached to a second end 28 of the plate 20. The plate 20 extends between the front wheelchair 12 and the rear wheelchair 14 and is substantially parallel to a surface upon which the front wheelchair 12 and the rear wheelchair 14 are positioned. The plate 20 is configured so that feet of the second person can be rested upon it.

An attendant is positioned to wheel the first person and the second person simultaneously across the surface. The present invention is anticipated to be useful in care facilities, such as hospitals, clinics, nursing homes, and the like, as well as other facilities, such as airports, stadiums, and the like. In many circumstances, one person may be accompanied by another person for a hospital or clinic visit. When they arrive, it may come to pass that both persons require use of a wheelchair, but there may be only one attendant available. The tandem wheelchair assembly 10 solves this problem.

There are a variety of configurations of wheelchairs known to those skilled in the art of wheelchairs and these are anticipated by the present invention as configurations for the front wheelchair 12 and the rear wheelchair 14. These configurations may include, but are not limited to, a configuration wherein the rear wheelchair 14 is motorized, with controls positioned proximate to handles 30 attached to the second frame 18. This configuration also may include a riding platform for the attendant.

Figure 6:
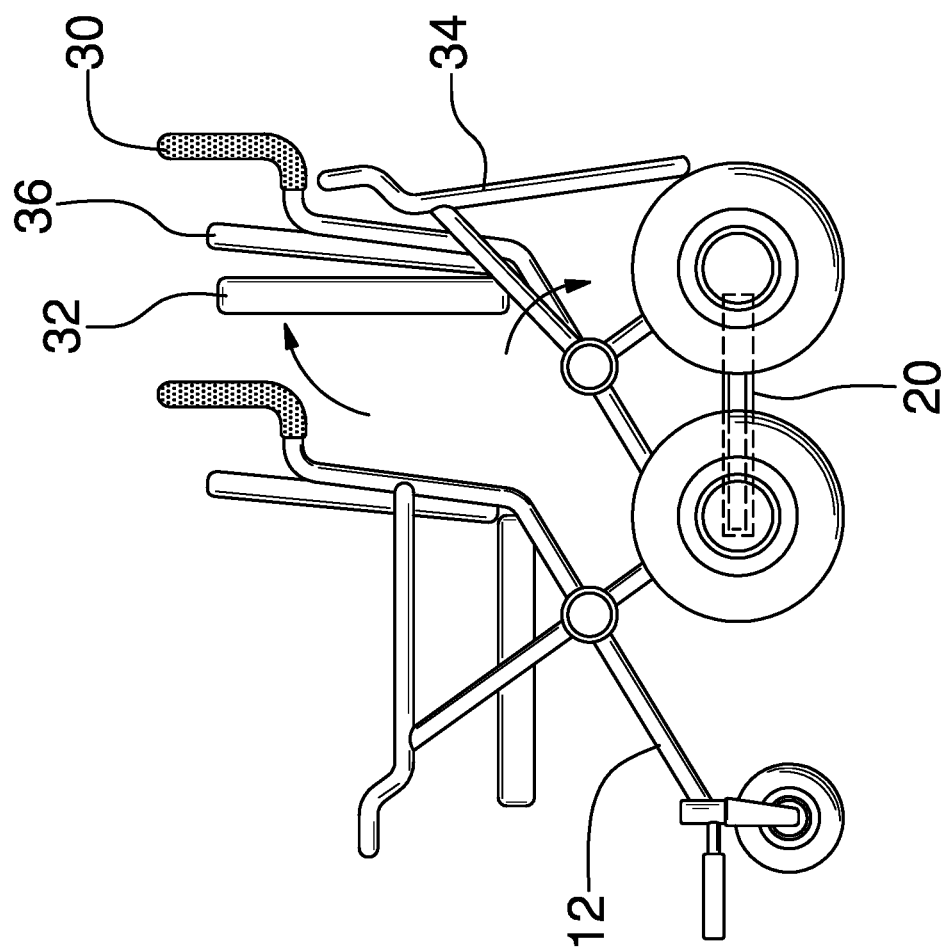
FIG. 6 is a side view of an embodiment of the disclosure in a stowed configuration.
Figure 7:
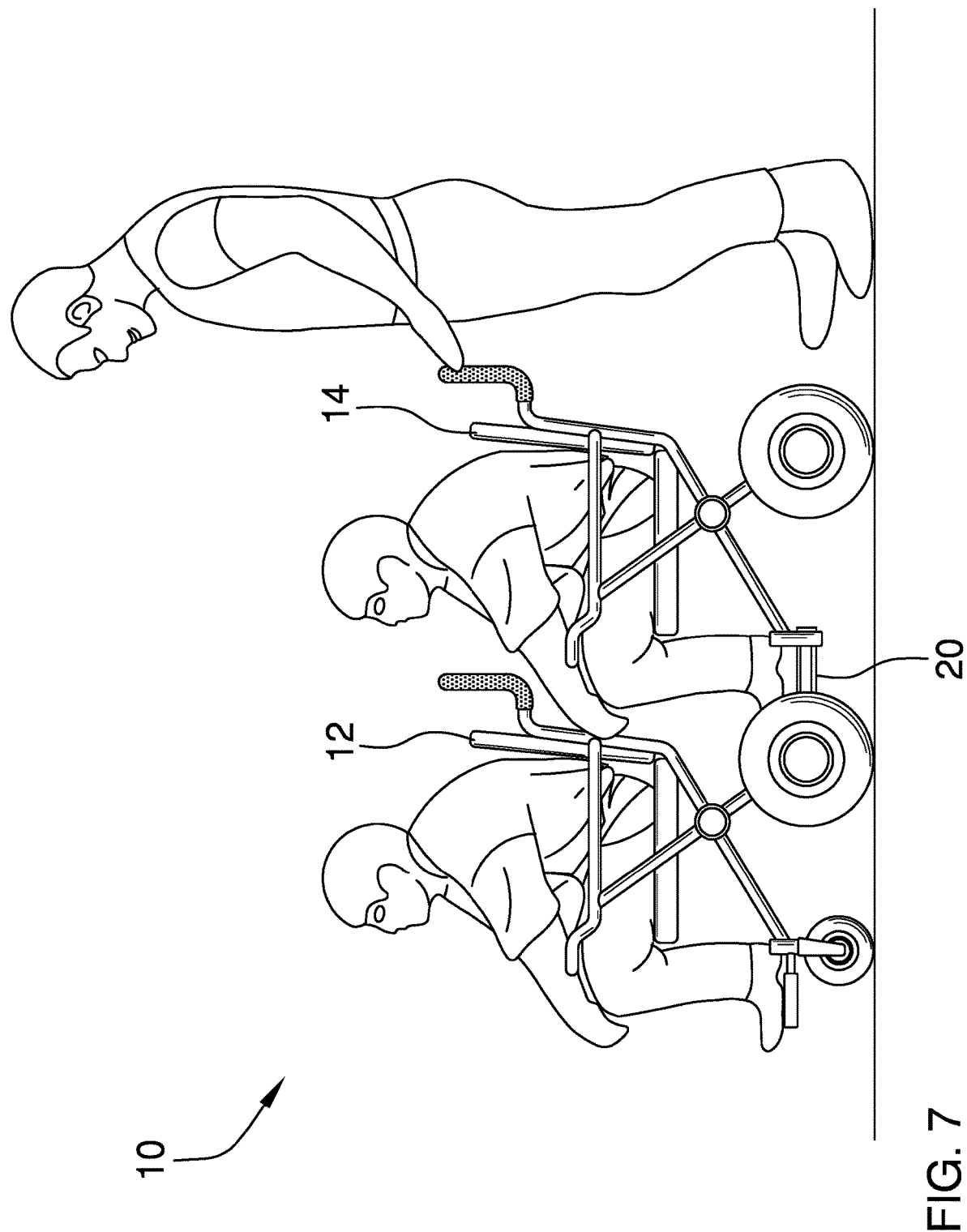
FIG. 7 is an in-use view of an embodiment of the disclosure.

A seat 32 and a pair of armrests 34 of the rear wheelchair 14 are hingedly attached to the second frame 18, as shown in FIG. 6. The rear wheelchair 14 thus is partially foldable into a compacted configuration, wherein the seat 32 and the armrests 34 are positioned proximate to a backrest 36 of the rear wheelchair 14. The second frame 18 is selectively slidable relative to the plate 20 so that the rear wheelchair 14 is positionable proximate to the front wheelchair 12 in a stowed configuration, as shown in FIG. 6. The front wheelchair 12 and the rear wheelchair 14 thus are readily stowable when not in use.

Figure 2:
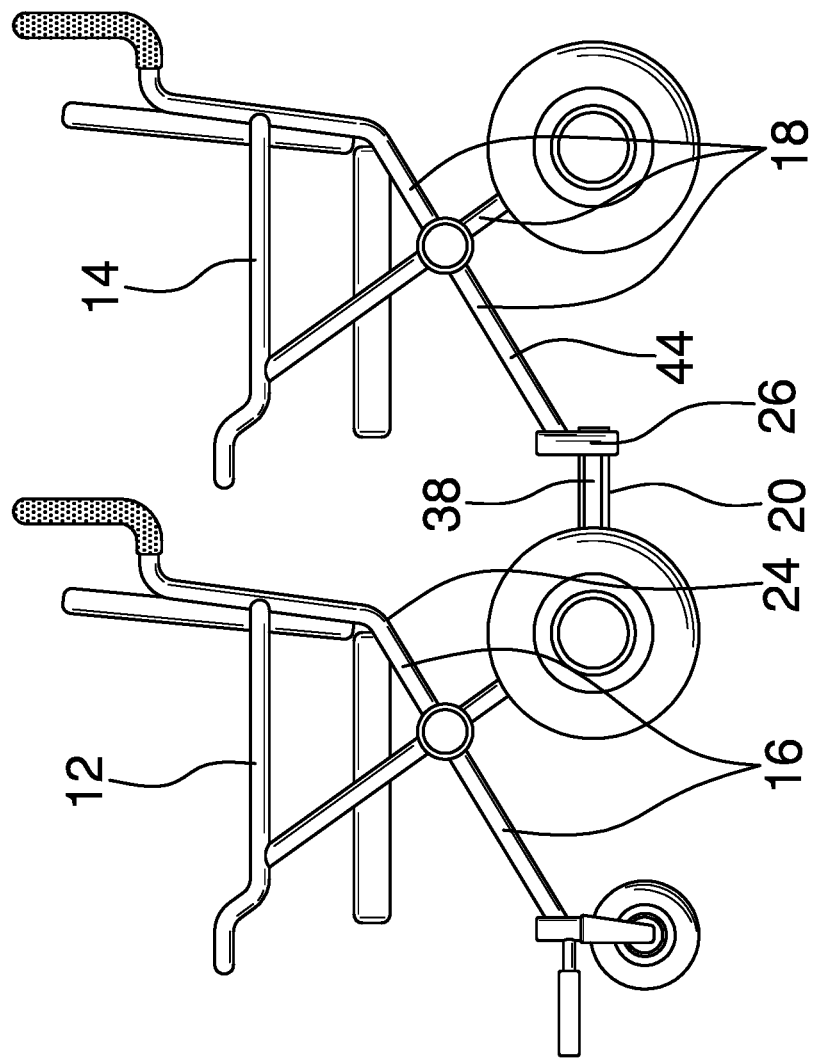
FIG. 2 is a side view of an embodiment of the disclosure in an extended configuration.
Figure 3:
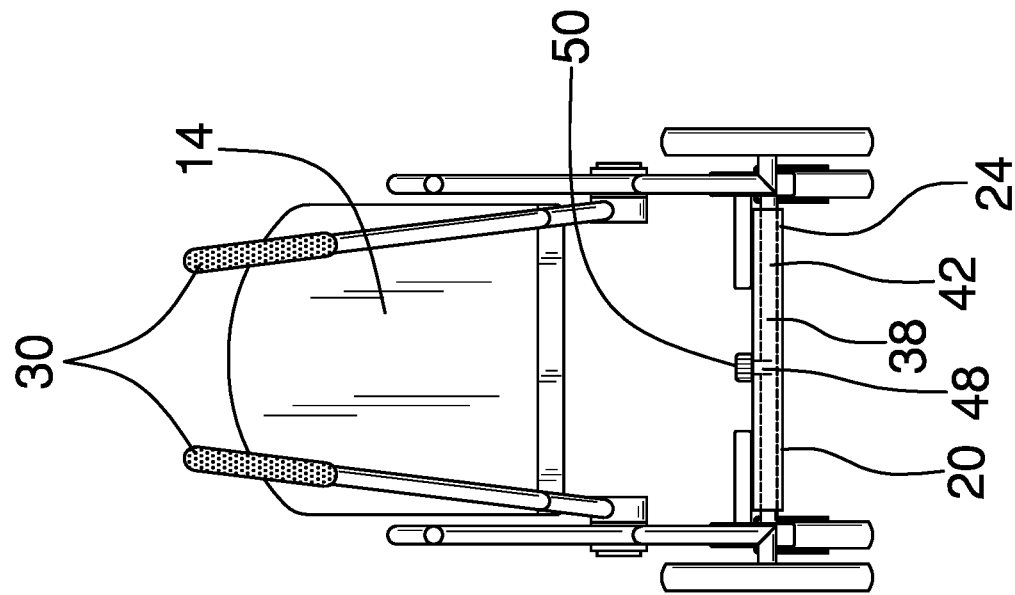
FIG. 3 is a front view of an embodiment of the disclosure.
Figure 4:
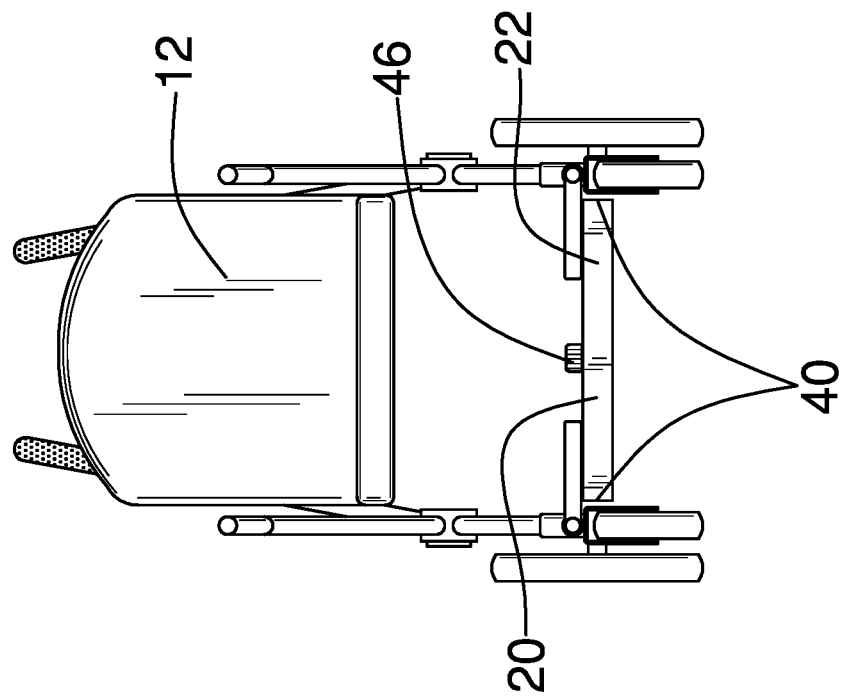
FIG. 4 is a rear view of an embodiment of the disclosure.
Figure 5:
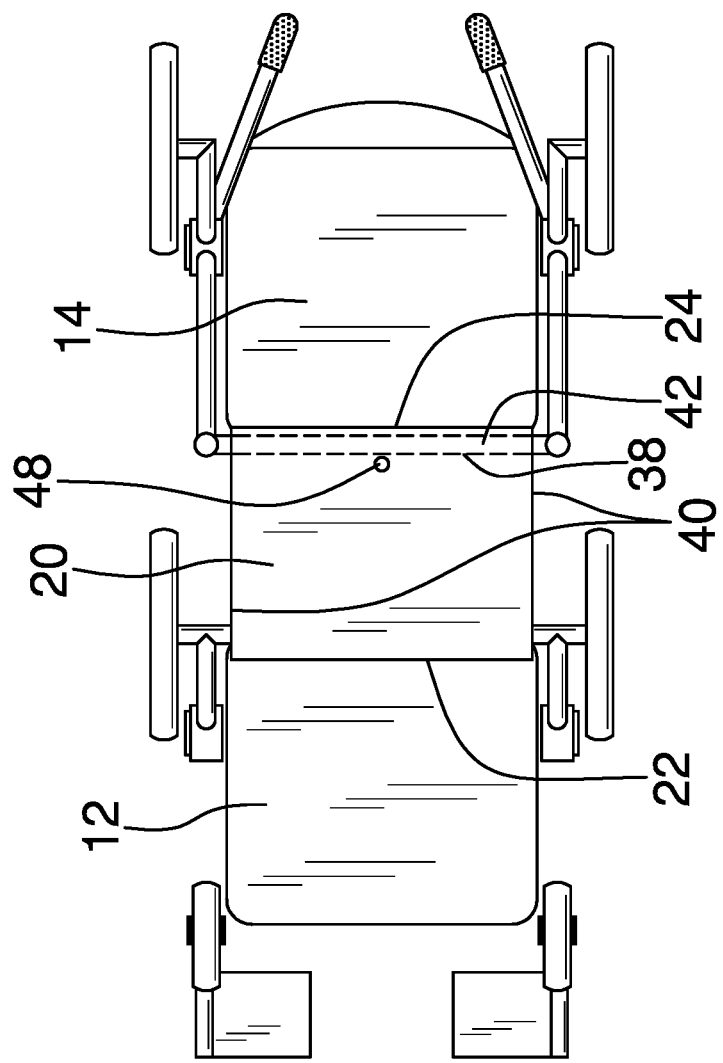
FIG. 5 is a bottom, view of an embodiment of the disclosure.

A slot 38 is positioned in the plate 20 and extends between opposed sides 40 of the plate 20 and from proximate to the first end 22 to proximate to the second end 28. A rod 42, which is positioned through the slot 38, is attached to and extends between forward members 44 of the second frame 18. The rod 42 is selectively slidable within the slot 38 to selectively position the rear wheelchair 14 relative to the front wheelchair 12. A fastener 46 is attached to the plate 20 proximate to the second end 28. The fastener 46 is positioned to selectively engage the rod 42 to prevent the rod 42 from sliding within the slot 38, thereby fixedly positioning the front wheelchair 12 and the rear wheelchair 14 in an extended configuration, as shown in FIG. 2.

The fastener 46 may comprise a pin 48, which is spring loaded so that the pin 48 is biased into the slot 38. A knob 50 is attached to the pin 48 and is positioned externally to the plate 20. The knob 50 is configured to be grasped in digits of a hand of the attendant, positioning the attendant to pull on the knob 50 to extract the pin 48 from the slot 38. With the pin 48 extracted from the slot 38, the rod 42 is selectively positionable between the pin 48 and the second end 28 of the plate 20 to fixedly position the front wheelchair 12 and the rear wheelchair 14 in the extended configuration. With the pin 48 extracted from the slot 38, the rod 42 also can be positioned between the pin 48 and the first end 22 of the plate 20. Thus positioned, the rod 42 is slidable within the slot 38 to position the rear wheelchair 14 and the front wheelchair 12 in the stowed configuration.

In use, the tandem wheelchair assembly 10 can but used to transport two persons, one each in the front wheelchair 12 and the rear wheelchair 14. Alternatively, the tandem wheelchair assembly 10 can be used in the stowed configuration to transport one person. Should another person require use of a wheelchair, the tandem wheelchair assembly 10 can be converted to the extended configuration, allowing the other person to be seated in the rear wheelchair 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tandem wheelchair assembly comprising:
a front wheelchair configured for seating of a first person and comprising a first frame;
a rear wheelchair configured for seating of a second person and comprising a second frame;
a plate fixedly attached by a first end proximate to, and extending from, a rear end of the first frame, a forward end of the second frame being attached to a second end of the plate, such that the plate extends between the front wheelchair and the rear wheelchair, and such that the plate is substantially parallel to a surface upon which the front wheelchair and the rear wheelchair are positioned, wherein the plate is configured for resting of feet of the second person, positioning an attendant for wheeling the first person and the second person simultaneously across the surface, the second frame is selectively slidable relative to the plate, such that the rear wheelchair is positionable proximate to the front wheelchair in a stowed configuration for stowing the front wheelchair and the rear wheelchair when not in use;
a slot positioned in the plate and extending between opposed sides of the plate from proximate to the first end to proximate to the second end;
a rod positioned through the slot, the rod being attached to and extending between forward members of the second frame, such that the rod is selectively slidable within the slot for selectively positioning the rear wheelchair relative to the front wheelchair; and
a fastener attached to the plate proximate to the second end, the fastener being positioned for selectively engaging the rod for preventing the rod from sliding within the slot, such that the front wheelchair and the rear wheelchair are fixedly positioned in an extended configuration.

2. The tandem wheelchair assembly of claim 1, wherein a seat and a pair of armrests of the rear wheelchair are hingedly attached to the second frame, such that the rear wheelchair is partially foldable into a compacted configuration, wherein the seat and the armrests are positioned proximate to a backrest of the rear wheelchair.

3. The tandem wheelchair assembly of claim 1, wherein the fastener comprises:
a pin, the pin being spring loaded, such that the pin is biased into the slot; and
a knob attached to the pin and positioned externally to the plate, wherein the knob is configured for grasping in digits of a hand of the attendant, positioning the attendant for pulling on the knob for extracting the pin from the slot, such that the rod is selectively positionable between the pin and the second end of the plate, for fixedly positioning the front wheelchair and the rear wheelchair in the extended configuration, or between the pin and the first end of the plate, such that the rod is slidable within the slot for positioning the rear wheelchair and the front wheelchair into the stowed configuration.

4. A tandem wheelchair assembly comprising:

a front wheelchair configured for seating of a first person and comprising a first frame;

a rear wheelchair configured for seating of a second person and comprising a second frame, a seat and a pair of armrests of the rear wheelchair being hingedly attached to the second frame, such that the rear wheelchair is partially foldable into a compacted configuration, wherein the seat and the armrests are positioned proximate to a backrest of the rear wheelchair;

a plate fixedly attached by a first end proximate to, and extending from, a rear end of the first frame, a forward end of the second frame being attached to a second end of the plate, such that the plate extends between the front wheelchair and the rear wheelchair, and such that the plate is substantially parallel to a surface upon which the front wheelchair and the rear wheelchair are positioned, wherein the plate is configured for resting of feet of the second person, positioning an attendant for wheeling the first person and the second person simultaneously across the surface, the second frame being selectively slidable relative to the plate, such that the rear wheelchair is positionable proximate to the front wheelchair in a stowed configuration for stowing the front wheelchair and the rear wheelchair when not in use;

a slot positioned in the plate and extending between opposed sides of the plate from proximate to the first end to proximate to the second end;

a rod positioned through the slot, the rod being attached to and extending between forward members of the second frame, such that the rod is selectively slidable within the slot for selectively positioning the rear wheelchair relative to the front wheelchair; and a fastener attached to the plate proximate to the second end, the fastener being positioned for selectively engaging the rod for preventing the rod from sliding within the slot, such that the front wheelchair and the rear wheelchair are fixedly positioned in an extended configuration, the fastener comprising:

a pin, the pin being spring loaded, such that the pin is biased into the slot, and a knob attached to the pin and positioned externally to the plate, wherein the knob is configured for grasping in digits of a hand of the attendant, positioning the attendant for pulling on the knob for extracting the pin from the slot, such that the rod is selectively positionable between the pin and the second end of the plate, for fixedly positioning the front wheelchair and the rear wheelchair in the extended configuration, or between the pin and the first end of the plate, such that the rod is slidable within the slot for positioning the rear wheelchair and the front wheelchair into the stowed configuration.

* * * * *